United States Patent

I-Shou

Patent Number: 5,155,662
Date of Patent: Oct. 13, 1992

[54] HARD DISC DRIVE MOUNTING STRUCTURE

[76] Inventor: Tsai I-Shou, 13FL, No. 409, Sec. 4, Jen-Ai Road, Taipei, Taiwan

[21] Appl. No.: 641,946

[22] Filed: Jan. 16, 1991

[51] Int. Cl.$^5$ .......................... H05K 7/12; H05K 5/00; H05K 7/14
[52] U.S. Cl. ..................... 361/392; 361/391
[58] Field of Search ............... 360/97.01, 97.02, 97.03, 360/97.04, 137; 364/708; 361/380, 390, 391, 392, 393, 394, 395, 399

[56] References Cited

U.S. PATENT DOCUMENTS

| | | | |
|---|---|---|---|
| 4,210,951 | 7/1980 | Ritter et al. | 361/391 |
| 4,688,131 | 8/1987 | Noda et al. | 360/137 |
| 4,717,982 | 1/1988 | Toreson et al. | 360/137 |
| 4,833,554 | 5/1989 | Dalziel et al. | 360/98.04 |
| 4,919,624 | 4/1990 | Masuda | 361/399 X |
| 4,937,806 | 6/1990 | Babson et al. | 361/391 X |
| 4,939,622 | 7/1990 | Weiss et al. | 361/391 |
| 4,941,841 | 7/1990 | Darden et al. | 364/708 X |
| 4,956,733 | 9/1990 | Dalziel | 360/137 X |
| 4,977,532 | 12/1990 | Borkowicz et al. | 364/708 |
| 5,047,898 | 9/1991 | Cooke et al. | 361/391 X |
| 5,081,551 | 1/1992 | Aruga | 360/97.01 |

FOREIGN PATENT DOCUMENTS 2-189787  7/1990  Japan ................................ 360/137

OTHER PUBLICATIONS

"Flexible Plastic Snap-In Retainers for Data Storage Device"; Research Disclosure, Nov. 1987, No. 283, Kenneth Mason Publications Ltd., England. Copy in 360-137.

Primary Examiner—Leo P. Picard
Assistant Examiner—Michael W. Phillips
Attorney, Agent, or Firm—Lowe, Price, LeBlanc & Becker

[57] ABSTRACT

A detachable hard disc driver mounting structure, comprising a hard disc drive received inside a sliding case and fastened in a receiving chamber inside a computer mainframe through plug-in connection. The sliding case has slide ways at two opposite sides corresponding to the two opposite rails inside the receiving chamber of the computer mainframe so that it can be drawing out of the receiving chamber and then pushed back into place. Stub tenon is made on the front end of the sliding case for engaging in the retaining slot at the inner end inside the receiving chamber. I/O pins are made on the hard disc drive at one end for connecting to the mother board of the computer mainframe through an I/O bus line connector.

1 Claim, 2 Drawing Sheets

HARD DISC DRIVE MOUNTING STRUCTURE

BACKGROUND OF THE INVENTION

The present invention relates to computer hard disc drive mounting structures, and more particularly to a computer hard disc drive mounting structure in which the hard disc drive is fastened inside a sliding case which can be fastened in a receiving chamber made in the computer mainframe of a computer through plug-in connection.

In regular personal computers, a hard disc drive, if it is required, is generally fixedly fastened inside the mainframe of a computer, i.e. a hard disc drive is provided for use in a specific computer. It is therefore an object of the present invention to provide a detachable hard disc drive mounting structure permitting a hard disc drive to be conveniently removed from one computer for use in another.

To achieve this object, there is provided a detachable hard disc drive mounting structure, in which the hard disc drive is fastened inside a sliding case by screws, which sliding case which can be conveniently releasably fastened in a receiving chamber made on the mainframe of a computer through plug-in connection. By matching the slide ways on the two opposite sides of the sliding case with the side rails inside the receiving chamber at two opposite sides, the sliding case can be drawn out of the receiving chamber and then pushed back into place. Input/output pins are made on the hard disc drive at one end conveniently for connecting to the mother board of the computer mainframe through an input/output bus line terminal connector.

DETAILED DESCRIPTION OF THE PREFERRED EMBODIMENT

Figure 1:
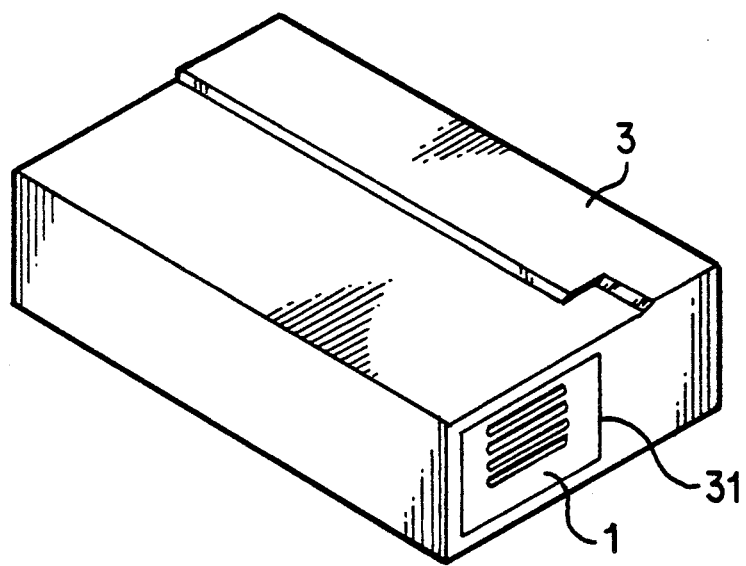
FIG. 1 is a perspective view of the assembled device of this invention.
Figure 2:
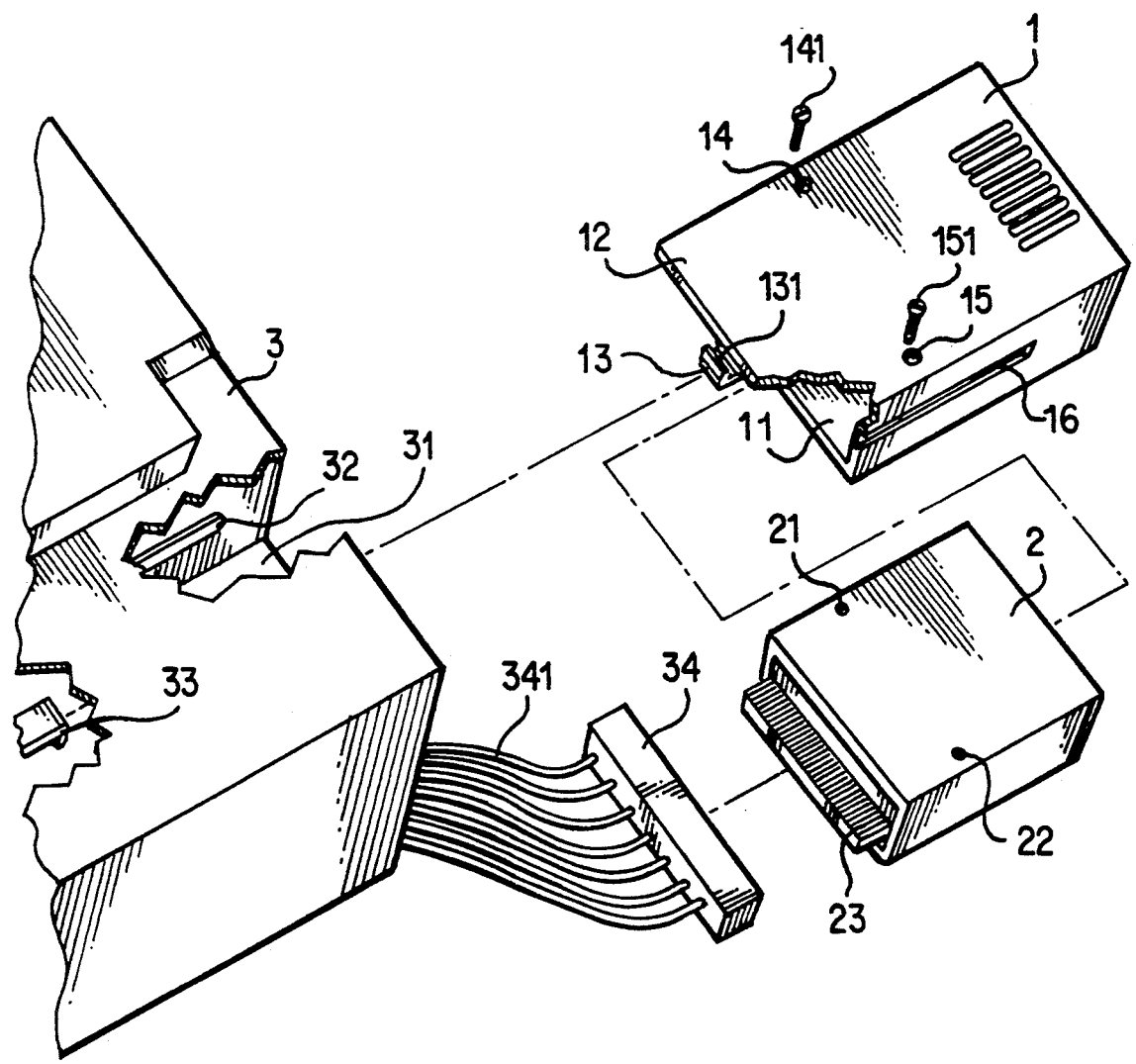
FIG. 2 is an exploded view of the device of this invention.

Referring to the annexed drawings in greater detail, a detachable hard disc drive mounting structure is generally comprised of a sliding case 1, a hard disc drive 2 and a computer mainframe 3.

The sliding case 1 is a substantially closed cabinet in shape suitable for holding the hard disc drive 2, having an opening 11 at one end through which the hard disc drive can be inserted inside the sliding case 1, a stub tenon 13 at the front edge 12 thereof, a groove 131 between said front edge 12 and said stub tenon 13, a plurality of bolt holes 14 and 15 on the top edge thereof, and two slide ways 16 at the two opposite sides thereof.

The hard disc drive 2 has a plurality of bolt holes 21 and 21 at the top edge thereof and at locations corresponding to the bolt holes 14 and 15, and input/output pins 23 at the front end thereof.

The computer mainframe 3 has a hard disc receiving chamber 31, a pair of rails 32 in said receiving chamber 31 at two opposite sides, a retaining slot 33 in said receiving chamber 31 at the inner end, a terminal connector 34 connected to a mother board (not shown, which controls the operation of the computer mainframe 3) through input/output bus line 341.

To assemble the present invention is quite simple and outlined hereinafter. Insert the hard disc drive 2 inside the sliding case 1 through the opening 11 and use screws 141 and 151 to respectively fasten in the bolt holes 14 and 21 or 15 and 22 so as to fixedly secure the hard disc drive 2 inside the sliding case 1. Then, connect the input/output pins 23 in the terminal connector 34 of the input/output bus line 341. The sliding case 1 and the hard disc drive 2 are then inserted in the receiving chamber 31 permitting the two rails 32 to respectively engage in the two slide ways 16. As soon as the sliding case 1 is inserted in the receiving chamber 31 to the limit, the stub tenon 13 becomes firmly engaged in the retaining slot 33. Thus, the mounting process is made. When pulling force is applied to the sliding case 1, the stub tenon 13 can be easily disengaged from the retaining slot 33, and therefore, the sliding case 1 and the hard disc drive 2 can be conveniently removed from the computer mainframe 3. After the sliding case 1 and the hard disc drive 2 are removed out of the computer mainframe 3, the input/output pins 23 are disconnected from the terminal connector 34 of the input/output bus line 341.

What is claimed is:

1. In a detachable hard disc drive mounting structure, comprising a hard disc drive received in a case which in turn is received in a chamber in a computer mainframe having a mother board with a plug-in connection, the improvement comprising:

said case having front and back ends and a top and a bottom, an opening being located at one of the ends through which said hard disc drive can be slidably inserted, and a stub tenon mounted thereon at the front end thereof, a groove being defined between said front end and said stub tenon, and a plurality of bolt holes being located on the top thereof, said case further having opposite sides and two slide ways mounted respectively on the two opposite sides thereof;

said hard disc drive having a plurality of bolt holes on a side thereof corresponding to the top of said case and registering on the bolt holes on said case and screw means for securing said hard disc drive inside said case through said holes, and input/output pin means mounted at an end thereof for releasably connecting said drive to the mother board of said mainframe thorough said plug in connection comprising an input/output bus line terminal connector coupled to said mother board;

said computer mainframe having a pair of rails within the chamber for receiving said slide ways on said case so as to slidably receive said case with said drive mounted within said case with said input/output pin means coupled to said mother board at said terminal connector, and a retaining slot defined within said receiving chamber for releasably retaining said stub tenon of said sliding case when said case is received in the chamber.

* * * * *